Figure 1:
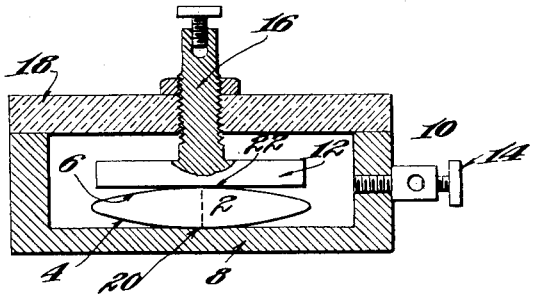

Oct. 18, 1938.   G. W. PIERCE   2,133,642
ELECTRICAL SYSTEM
Original Filed Feb. 25, 1924   3 Sheets-Sheet 1

Inventor
George W. Pierce
by David Rines
Attorney

Oct. 18, 1938.    G. W. PIERCE    2,133,642
ELECTRICAL SYSTEM
Original Filed Feb. 25, 1924    3 Sheets-Sheet 2
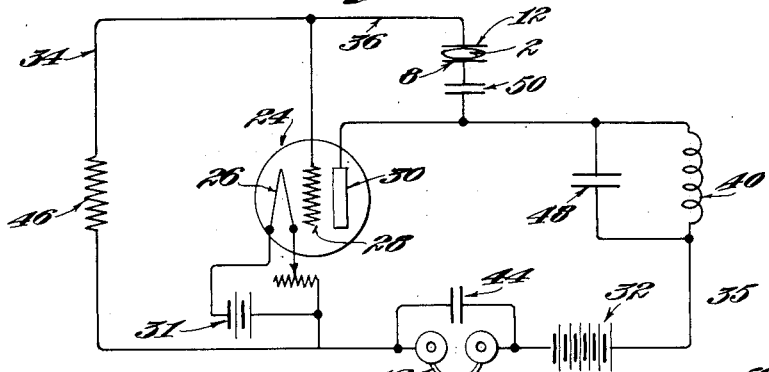
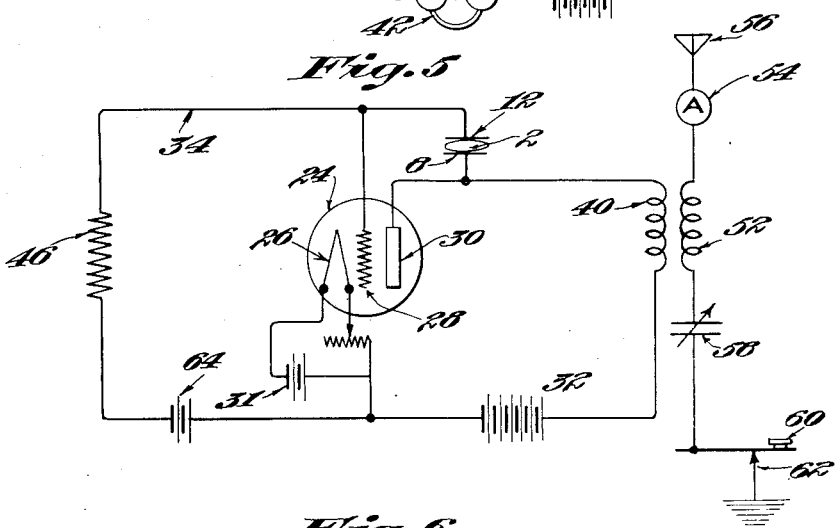
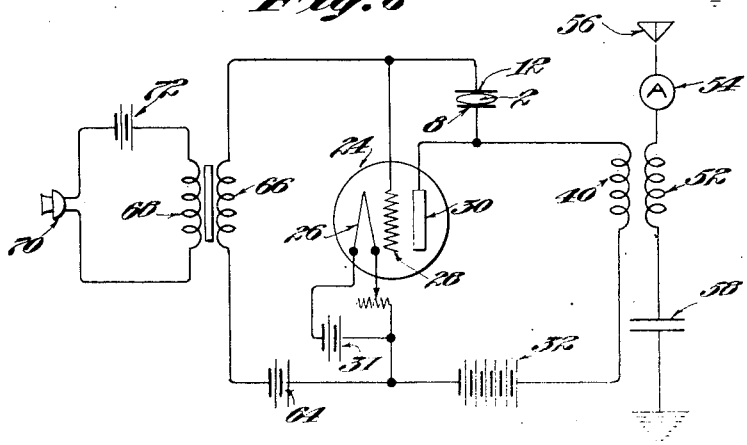
Inventor
George W. Pierce
by David Rines
Attorney Oct. 18, 1938.   G. W. PIERCE   2,133,642
ELECTRICAL SYSTEM
Original Filed Feb. 25, 1924   3 Sheets-Sheet 3

Inventor
George W. Pierce
by David Rines
Attorney

Patented Oct. 18, 1938

2,133,642

UNITED STATES PATENT OFFICE 2,133,642

ELECTRICAL SYSTEM

George W. Pierce, Cambridge, Mass.

Application February 25, 1924, Serial No. 695,094
Renewed April 18, 1930

106 Claims. (Cl. 250—36)

The present invention relates to electrical systems, and more particularly to methods of and apparatus for producing and sustaining the oscillations of electrical and mechanical systems. From a more limited aspect, the invention relates to systems that employ the inter-action of an electro-mechanical vibrator and an electric circuit to generate electrical and mechanical oscillations.

Electro-mechanical vibrators of the above-described character have the property of executing mechanical vibrations under vibratory electrical stimulus; and, conversely, of developing electrical potentials as a result of their mechanical vibrations. Piezo-electric bodies,—such as a whole crystal or part of a crystal of quartz, Rochelle salt, tourmaline, and the like,—have long been known to possess this property. Such bodies possess at least one, and usually two or more, axes—known as the electrical axes of the body—that have definite orientations in the original crystal. When a potential gradient, with a component in the direction of an electric axis, is applied to such a crystal body, the body undergoes mechanical deformations; and conversely, when the crystal body is deformed, a potential gradient is established in the body. The crystal body is, in general, capable of two or more particular modes of mechanical vibration, of different frequency, that correspond to two or more of its dimensions. These mechanical and electrical effects are normally transitory, for the crystal body will not, of itself, persist in continuous vibration.

An object of the present invention is to provide a novel method of, and a novel system and novel apparatus for, rendering these effects oscillatory in character, and persistent.

A further object is to provide an improved method of, and improved apparatus for, producing oscillations at very nearly constant frequency.

Another object is to improve the efficiency of oscillatory systems.

Another object is to obviate interference in oscillatory systems.

With these ends in view, a feature of the invention resides in a novel electrical system comprising an electric circuit that is not, in itself, oscillatory, and that is not, in itself, a source of alternating currents, in combination with an electro-mechanical vibrator that will not, in itself, persist in continuous vibration; the electrical parameters or constants of the system being such as to render the system stably non-oscillatory when not under the control of the electro-mechanical vibrator; and the connections being such, however, that the resulting electrical system oscillates at a frequency determined, to a high degree of precision, by the frequency of one of the modes of mechanical vibration of the electro-mechanical body; and the frequency being essentially unmodifiable, even by large changes of the electric constants of the circuits of the system, except in cases where certain controllable changes, as hereinafter stated, may result in shifting the frequency from that of one mode to that of another distinct mode. In the preferred forms of the present invention, the disturbing effects,—such as those produced by changes of temperature, changes of mounting supports, changes of electrical constants, and the like,—on the frequency of oscillations usually amount to less than one one-hundredth of one per cent of the frequency. These small effects are nevertheless well under control, in the present invention, and are themselves utilized to introduce useful minute variations of frequency, when desired. It is believed that the present invention provides, over a wide range of frequencies, and particularly at high frequencies, a source of electrical and mechanical oscillations of frequency more constant and more stable than any heretofore known.

Since the electro-mechanical vibrator is, in general, capable of two or more modes of vibration, of different frequencies, the present invention provides means for changing at will from one mode to another; and, in some cases, for the utilization of two or more frequencies coexistent at the same time, in the same system.

Piezo-electric crystals are usually provided with terminals or electrodes. It is by means of these electrodes that the crystal is adapted to be connected in an electric circuit. It has hitherto been proposed to provide two pairs of electrodes to adapt the crystal for use in an oscillatory system,—one pair to be connected with the input terminals of an amplifying device, and the other pair to be connected with the output terminals. The theory of the operation is that the energy of the vibrating crystal will be transferred from the output terminals to the input terminals. A similar proposal has been made for systems comprising electrically driven tuning forks. These proposals are not, however, adapted for high frequencies; since, for high frequencies, the mechanical vibrator becomes of such small dimensions that there is not room for two pairs of electrodes or two pairs of magnets of sufficient size to operate the device, and at the same time avoid the electrical feed-back that produces vibrations independent of the mechanical system, and lacking in the desired constancy. The proposed multiple-paired piezo-electric oscillator, furthermore, depends for its operation upon the lengthwise period of vibration of the crystal body; whereas, for high frequencies, it is necessary to use the period of the crystal vibrations determined by a dimension of the specimen which is small comared with its other dimensions, as by its thickness, the crystal plate vibrating in its thickness mode, and this must be of the order of one millimeter for a frequency of 3000 kilocycles per second. Such high frequency is obviously unattainable with a multiple-paired piezo-electric oscillator.

It is therefore still another object of the present invention to improve upon and simplify the apparatus employed in, and the electrical connections of, oscillatory systems.

To this end, a feature of the invention contemplates the use, in general, of but a single pair of active, electrical terminals or electrodes applied to the electro-mechanical vibrator. The apparatus of the present invention may therefore be equally well employed at high, as at low, frequencies. I have constructed apparatus, according to the present invention, for fundamental frequencies ranging from 35 kilocycles per second to 3,000 kilocycles per second. I have utilized harmonics of the device at frequencies of 20,000 kilocycles per second, corresponding to an electric wave of fifteen meters wave length. This range may undoubtedly be extended in both directions.

Other and further objects of the invention will be explained hereinafter, and will be pointed out in the appended claims, it being understood that it is intended to cover in the appended claims all the novelty that the invention may possess.

Figure 2:
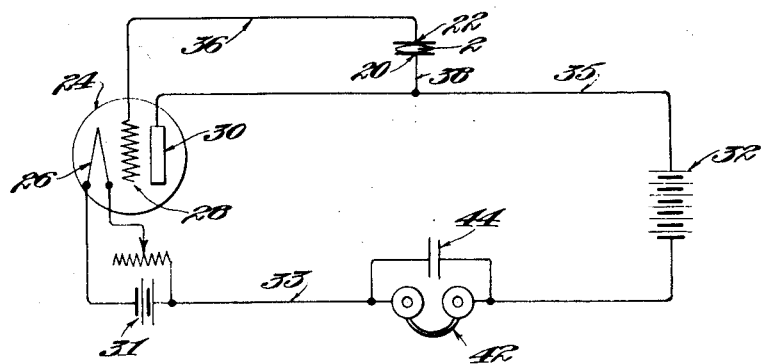
Figure 3:
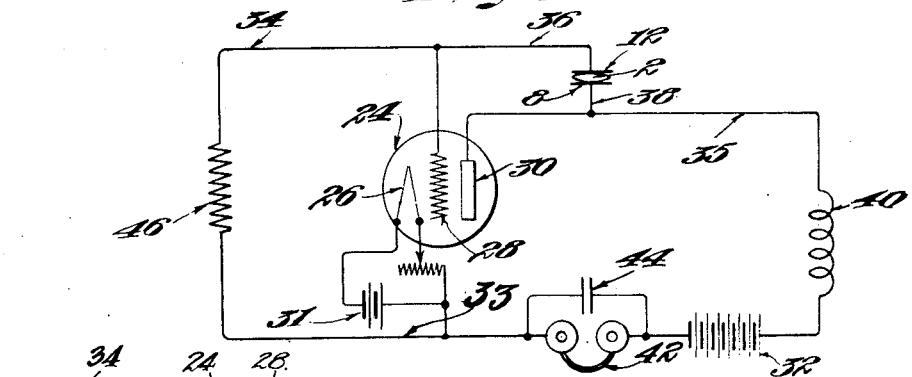
Figure 11:
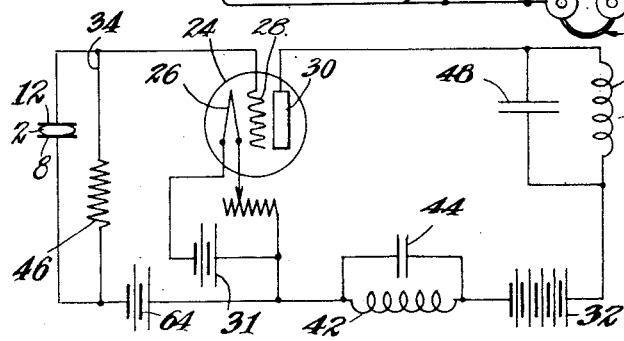

In the accompanying drawings, Fig. 1 is a sectional view of an electro-mechanical vibrator of preferred form, comprising a piezo-electric body provided with electrodes; Fig. 2 is a diagram of circuits and apparatus illustrating an operable embodiment of the invention; Fig. 3 is a similar diagram with additional elements; Fig. 4 is a view similar to Fig. 3, with still further additional elements, one of which is electrically tunable; Fig. 5 represents a radio-telegraphic transmitting apparatus embodying the invention; Fig. 6 represents a radio-telephonic transmitting apparatus; Fig. 7 is a modified transmitting apparatus; Fig. 8 represents an embodiment of the invention in a receiving system for beat reception; Fig. 9 is a radio-telephonic transmitter using power amplification and embodying the invention; Fig. 10 is a diagrammatic view illustrating a means for changing the frequency by changing the mode of vibration of the electro-mechanical vibrator, which is effected by switching a circuit connection; and Fig. 11 is a diagram illustrating a further modification.

All of the figures, except Fig. 1, show the employment of the electro-mechanical vibrator as the means for determining the wave frequency. This electro-mechanical vibrator is differently disposed in the different diagrams, so as to illustrate the many different ways in which the vibrator may be employed to introduce oscillations into the system, but it is to be understood that the electro-mechanical-vibrator disposition, in a particular diagram, is not specific to that diagram, but that the vibrator may be similarly disposed in the other diagrams.

It will conduce to an understanding of the invention to describe, first, a preferred form of electro-mechanical vibrator, which, in Fig. 1, is illustrated as of the piezo-electric type. The invention is not, however, in its broader aspects, limited to such a crystal body, but may employ any body or mechanism having like properties in itself, or like properties introduced by electric currents, electric polarization, magnetic fields, etc. At 2 is shown a piezo-electric body, which has one of its electrical axes in the direction of the thickness of the crystal plate, along the line 20—22. I have found many different shapes of piezo-electric crystal body to be operative, such as a parallelopiped or a flat disc, but for many purposes, I prefer that the piezo-electric body and its electrodes be, the one or the other, slightly curved, to diminish friction or clamping between the body and its electrodes. I have hence illustrated the piezo-electric body as lenticular in shape. It may be constituted of any suitable substance having sufficiently pronounced piezo-electric properties. Quartz is preferred, because of its durability and constancy. Though the preferred shape of crystal element constitutes a feature of the present invention, it will be understood that many features, hereinafter described, are not restricted to the use of any particular substance or any particular shape. The term "electro-mechanical vibrator"—or, more simply, the term "vibrator"—will therefore be employed hereinafter, in the specification and the claims, to denote any substance, material or arrangement, whether or not crystalline in character, that is endowed with the above-referred-to property of changing shape or dimensions under the action of an electric force or an electric current and of reacting on the electric circuits.

The oppositely disposed, convex surfaces of the lenticular plate 2 are indicated at 4 and 6. The surface 4 is shown contacting with, or slightly separated from, the bottom 8 of a box, receptacle or housing 10 that is constituted of a conducting material, as a metal, and the surface 6 contacts with or is near to a second conducting member 12. The bottom 8 and the member 12 constitute the opposed electrodes, terminals or plates of the crystal. The electrode 8 is electrically connected to a binding post 14 and the plate 12 is electrically connected to a binding post 16. Electrical connection is thus established between the two sides 4 and 6 of the crystal and the terminal binding posts exterior of the box or housing 10. The binding post 14 is simply secured to a side of the box 10. The binding post 16 is threaded through an insulating cover 18 of the box 10, and is secured to the plate 12. The cover 18 may be constituted of hard rubber. By screwing the binding post 16 in one direction or the other, the plate 12 may be caused to approach the crystal 2 more or less nearly, as desired. Owing to the fact that the surfaces 6 and 4 are convex, the plates 8 and 12 approximate or touch the crystal at two oppositely disposed points, or small areas, indicated at 20 and 22, thus allowing for expansion or contraction with small friction or obstruction. The preferred form of electro-mechanical vibrator is thus illustrated as a two-electrode piezo-electric crystal plate 2, adjacent to the oppositely disposed sides or surfaces 4 and 6 of which are provided the two opposed conducting electrodes, terminals or plates 8 and 12 by means of which the vibrator is adapted to be connected in an electric circuit. Such a crystal plate is sometimes termed a piezo-electric resonator.

When the crystal body 2 assumes the form of a parallelopiped or a flat disc, its lower flat surface 4 may be horizontally disposed in contact with the upper flat surface of the electrode 8, and the electrode 12 is spaced slightly above its upper flat surface 6, with the electrodes 8 and 12 disposed substantially perpendicular to the electric axis 20, 22 of the crystal. In order to exhibit its piezoelectric properties, electrical connection with the upper surface 6 of the crystal 2 may be established through the electrode 12, and with the lower flat surface 4 of the crystal 2 through the electrode 8, into any electric circuit. The crystal 2 is thus substantially horizontally supported between and adjacent to the lower substantially horizontally disposed substantially flat surface of the upper electrode 12 and the upper substantially horizontally disposed substantially flat surface of the lower electrode 8, with its oppositely disposed substantially flat upper and lower faces 4 and 6 substantially horizontally disposed respectively adjacent and substantially parallel to the respective substantially flat surfaces of the electrodes.

The preferred form of electromechanical vibrator having thus been described, reference may now be had to Fig. 2 for an embodiment operable according to the present invention. For illustrative purposes, a hermetically sealed multi-electrode electron or electron-discharge vacuum tube container 24 is diagrammatically shown provided with three sensitive elements or electrodes, namely, an electron-emitting cathode filament 26, a first cold electrode, shown as a control grid 28, and a second cold electrode, shown as a plate or anode 30. The vacuum tube 24 may constitute an amplifying relay. As illustrated, the cold electrodes 28 and 30 are unequally spaced from the cathode 26, the electrode 28 being the inner cold electrode and the electrode 30 being the outer cold electrode. The control electrode or grid 28 controls the transmission of current between the cathode 26 and the anode 30.

The invention is not restricted to the use of this particular type of tube, but it will serve for illustrative purposes; it being understood, however, that the terms "plate" or "anode" and "grid", as used herein, will include within their scope other sensitive elements of different types of tubes, and that the term "filament" or "cathode" will be employed, in the specification and the claims, to include any suitable means for rendering the space of the tube conducting,— exemplified in the drawings by the filament proper 26 connected to the filament-heating battery 31. The vacuum tube is provided with a grid or input circuit interconnecting or including the grid 28 and the cathode 26, and an anode or plate or output circuit interconnecting or including the cathode 26 and the plate 30. The plate and the grid circuits are shown in Figs. 7 and 8 substantially mechanically and electrically disassociated from each other except for the association introduced or caused by the electron stream between the plate and the cathode within the electron-tube container 24. Substantially all the regeneration of the regenerative oscillatory system thus produced is effected through capacitive coupling between the grid 28 and the anode 30. A plate battery 32 is connected to the filament 26 by a conductor 33, and to the plate 30 by a conductor 35. The plate battery 32 constitutes a source of energy for charging the plate 30 with a unidirectional suitable operating potential. A telephone receiver 42, with or without a bypass condenser 44, may be inserted in the conductor 33. As so far described, the system is not oscillatory. If, now, one of the electrodes of an electro-mechanical vibrator, such as that of Fig. 1, be connected by a conductor 36 to the grid, and the other electrode by a conductor 38 to some point in the circuit of the plate 30, the system will oscillate with sustained oscillations and the vibrator will vibrate mechanically, at a frequency determined, to a high degree of precision, by the frequency of one of the modes of mechanical vibration of the electro-mechanical vibrator. The mode of vibration depends somewhat on the point of connection to the plate circuit. This is explained below. A system originally not oscillatory, in the absence of the vibrator, is thus rendered oscillatory, when the vibrator is connected into circuit with a fixed period of oscillation determined by the frequency of some mode of vibration of the vibrator, and the oscillations will continue as long as the circuits and the energy-supplying batteries remain intact.

The utility of the present invention is not, of course, dependent upon the existence or the non-existence of theories, whether accurate or inaccurate, to account for the observed phenomena. It is sufficient to describe and illustrate the invention as it has been found to work in practice. The theory of operation is, however, probably as follows: First, a circuit is established from the battery 32, by way of the conductors 35 and 38, to the vibrator 2, and from the vibrator 2, by way of the conductor 36 to the grid 28. The vibrator is thus stimulated and commences to vibrate. In so vibrating, it reacts upon the current in the circuit thus established, and, incidentally, affects the potential of the grid 28. The potential of the grid 28 is alternately increased and decreased many times a second, corresponding to the natural frequency of mechanical vibration of the vibrator. These potential variations of the grid therefore affect the current flowing from the battery 32 through the tube 24, resulting in the establishment of oscillations in the circuit extending from the battery 32, by way of the conductor 35, to the plate 30, through the ionized space in the tube, to the filament 26 and by way of the conductor 33, back to the battery 32. The oscillations of this circuit, in turn, act to stimulate the vibrator to maintain it in vibration and the vibrator, in its turn, responds to maintain the system in oscillation with a fixed period determined by the vibrator. When the telephone 42 is not needed, it may be replaced by an inductance, as illustrated in Fig. 11, the primary winding of a transformer, or the input terminals of an amplifier, or it may be wholly short-circuited.

In the specification and the claims, the action of the electric forces that cause mechanical displacements of the crystal, resulting in its vibration, will be termed "stimulation"; and the development by the vibrating crystal of the electromotive forces that react upon the circuit will be termed "response".

Fig. 3 resembles Fig. 2. An element 40, shown as an inductance coil having a distributive capacity and resistance, is, however, connected in the output or plate circuit, between the battery 32 and the conductor 35. The coil 40, which acts as an admittance, may be replaced by a resistor or any other proper type of electrical apparatus or elements, tuned or untuned, in which the oscillatory power is utilized. If a resistor 40 is employed, its distributive capacity and the capacity between the electrodes of the tube supply the parameters having the requisite values for determining the oscillating condition, as will be understood from the description to follow.

Fig. 3 also shows a connection 34 having an impedance element 46 connected in the grid or input circuit. This may be used to give the grid a suitable potential about which its fluctuations occur.

A space-discharge oscillation generator is thus produced, the oscillating frequency of which is dependent merely on the physical dimensions and properties of the crystal 2, and is substantially independent of the electrical parameters of the circuits.

A tuning condenser 48 may be connected in parallel with the coil 40, in the output circuit, external to the input circuit, and may be employed to control the amplitude of the current fed back from the output circuit to the input circuit, and stabilized as to frequency in accordance with the natural period of the piezo-electric device. The parallel-connected tuning-condenser capacity 48 and inductance 40 constitute a tunable resonant circuit connected in the output circuit of the tube. Other elements resonant to a frequency widely different from the oscillation frequency may also be used. The power of the system may, for some purposes, be increased by electrical tuning of some other element into or near resonance with the frequency of the mechanical vibrations of the vibrator. Such tuning makes it possible to exclude undesired frequencies. To understand what is meant by the term "tuning", it will be recalled that, when a circuit exhibits inductive reactance for one band of frequencies, capacitive reactance for a second band of frequencies, and zero reactance for a particular frequency between these two bands, the circuit is said to be "tuned" or "resonant" at the said particular frequency. Alternatively, this may be stated in terms of the phase relations between the voltage across the circuit and the current through the circuit. When, at any particular frequency, a circuit that exhibits reactance at other frequencies exhibits an impedance that is a pure resistance at the said particular frequency, so that the said current and the said voltage are in phase, that circuit is said to be tuned or resonant at the said particular frequency.

Assuming the parameters of the circuit to be properly chosen to produce crystal-controlled oscillations, as by approximate adjustment of the various elements of the system, the system will oscillate with a frequency determined by the frequency of some resonant mode of mechanical vibration of the electromechanical vibrator; that is, the parameters of the system will have electrical characteristics such as to render the system oscillatory under the control of the vibrator at a substantially constant frequency that is stabilized and determined by some mode of mechanical vibration of the vibrator substantially independent of the value or the nature of the element 40, and such as to render the system stably non-oscillatory when not under the control of the vibrator. The electrodes 8 and 12 act conjointly both for stimulation and response, the vibrator being stimulated by the oscillations so as to be maintained in vibration, and responding to maintain the system in oscillation, with a fixed period determined by the vibrator.

The stably non-oscillatory circuit of the present invention is to be contrasted with the circuits described, for example, in the patent to Cady, 1,472,583, page 2, lines 110 and 111 and page 3, line 73, which are so loosely coupled as to be on the border line between oscillatory and non-oscillatory. The coupling is so loose that the circuit is on the very verge of oscillating, yet does not do so; as the Cady patent describes it, the circuit "just fails" to oscillate. Slight fortuitous plate or cathode voltage changes, or other changes of the circuit parameters or constants, are continuously being introduced, in practice. These may be caused, for example, by accidental changes of a condenser (as when it becomes aged), an inductance, or a tube characteristic (as when the tube deteriorates, or becomes replaced by another tube); or by a slight running down of a battery, or a change in the inductance or the capacity of a coil caused by vibration or heating, or even a change in temperature. Changes of this character may readily throw the said border-line system into a condition that is oscillatory without the crystal, the oscillations so produced being of any frequency determined by the electrical parameters of the system itself, and independent of the vibrations of the crystal, just as though the crystal were not present. Such changes have no observable effect, however, upon the stably non-oscillatory system of the present invention. The crystal constitutes an essential element of the system; without the crystal, the system can not oscillate under any conditions. As the oscillations are thus always determined by the crystal, they are necessarily constant and unmodifiable always, even though wide changes of the electric parameters or constants are introduced. Parasitic oscillations are inhibited. The system of the present invention, in other words, is stably non-oscillatory in the absence of the crystal.

An easy way of selecting suitable circuit parameters for oscillation controlled by any vibrational mode of the crystal is to tune the circuit elements. For example, the plate or output circuit of the tube 24 may be adjusted by means of the condenser 48, so as to obtain high-current output. Due to the action of the crystal in maintaining constant the oscillation frequency, such adjustments are not critical; oscillations will be generated for a wide range of values of the condenser 48 or of the coil 40. Alternatively, the coil 40 may be so chosen as to have suitable resonant properties without the use of a discrete condenser 48. In attempting to obtain oscillations, of course, one would always select proper parameters; and tuning the circuits by means of the condenser 48 is one way of obtaining such proper parameters.

An impedance, shown as a condenser 50, may be inserted between the plate 30 and the grid 28, in series with the vibrator, as is also illustrated in Fig. 4, to relieve the voltage on the vibrator, though the condenser 50 is by no means necessary.

A radio-telegraphic transmitting apparatus according to the present invention is illustrated in Fig. 5. The coil 40 is coupled to a coil 52 in the usual manner. The coil 52 is connected, in series with a hot-wire ammeter 54, to an antenna 56, and through a tuning condenser 58, to a sending key 60. The key 60 is adapted to make and break contact with a grounded contact member 62. The coils 40 and 52 are so adjusted as to tune the system for the maximum current, as observable in the ammeter 54. The method of telegraphing will be obvious to persons skilled in the art, and need not be further described.

If desired, a biasing battery 64 may be employed to bias the grid 28, the battery 64 constituting a means for charging the grid 28 with a different predetermined unidirectional suitable operating potential, as is also illustrated in Fig. 5. The potential of the grid will then fluctuate about the biased value, with a frequency determined by the mechanical vibrations of the vibrator.

The biasing battery 64 may be chosen of such voltage as to permit oscillations to be produced. In a circuit of the illustrated character, this bias will usually be negative, so as to polarize the grid 28 negatively with respect to the cathode 26. The battery 32, on the other hand, will subject the anode 30 to a positive potential with respect to the cathode 26.

For telegraphing or telephoning over line wires it is evident that the antenna circuit of the various figures may be replaced by well-known connections to the line wires. The same remark applies to reception along line wires as alternative to reception by an antenna.

For telephoning in accordance with the present invention, the connections shown in Fig. 6 may be employed. The impedance element 46 here takes the form of the secondary winding 66 of a modulation transformer, and the tuning condenser 58 is shown connected to the ground. The primary winding 68 of the transformer may be connected to a microphone 70, in circuit with a source of energy, shown as a battery 72. The grid will now be subjected to fluctuations of voltage caused not only by the vibration of the electro-mechanical vibrator, but also by the microphone. The variations produced by the microphone will modulate the carrier oscillations of the system. The operation will be understood by persons skilled in the art without further description.

Both in telegraphy and in telephony, as described in connection with Figs. 5 and 6, the oscillations of the system will be kept at practically constant frequency by the vibrator, making it possible, for example, to use a very high frequency, with all the advantages flowing therefrom.

In all the illustrations so far described, the electro-mechanical vibrator has been inserted between the grid and the plate of the vacuum tube. This arrangement is by no means essential. The vibrator is inserted in the system of Figs. 7 and 11 in the input grid circuit, between the filament and the grid; and in that of Fig. 8, in the plate circuit, between the filament and the plate. The winding 40 of Fig. 7 acts as an admittance. The word "admittance", which is quantitatively the reciprocal of an impedance, is herein used to designate an electrical circuit element or combination of elements, looked at with reference to its facility for passing current under a given electromotive force. The hereinafter-mentioned winding 80 and condenser 82, for example, constitute an admittance. A piezoelectric crystal provided with electrodes also constitutes an admittance. In general, if any electric system is provided with two oscillation circuits, each, for example, having a condenser in parallel with an inductance, one of the two circuits may be replaced, according to the present invention, by the electro-mechanical vibrator, and the oscillations of the resulting system, when established, will be of the frequency of the vibrator and highly constant.

Electric circuits have heretofore been produced with parameters having electrical characteristics such as to render the system stably non-oscillatory in the absence of a tuned element of the system and such as to render the system oscillatory when the tuned element is connected with the system. One of the prior-art circuits, for example, comprised a tuned element in the grid circuit and another tuned element in the plate circuit, the grid and plate circuits being uncoupled except for the capacity coupling between the grid and the plate. Such circuits, as is well known, will not oscillate unless proper circuit elements are chosen. In the oscillator herein shown, one of the said tuned elements of the prior art may be replaced by the electromechanical vibrator in the grid circuit, for example, as illustrated in the drawings. As in the case of the prior-art circuits, oscillations will or will not be produced, depending upon whether proper circuit elements have been chosen; but when oscillations are established, they will be of the frequency of the vibrator and highly constant.

In the system of Fig. 7, the two-electrode crystal, being disposed in the input circuit only, forms the only path between the grid and the cathode in which high-frequency currents of the order of magnitude of a natural frequency of the crystal cause resonance effects. This input circuit is substantially untuned for the frequency of oscillation, except through the crystal. A path for direct current is afforded by the coil 66, which coil 66 acts as a leakage path from the grid 28 to the cathode 26 to choke back currents of the frequency of the oscillations and prevents the crystal oscillating voltage from passing substantially beyond the zero grid voltage and becoming a positive voltage.

In Figs. 2 to 6 and Fig. 7, the crystal is connected in a control circuit. In the one case, the control circuit is between the control grid electrode 28 and the anode electrode 30; and in the other, between the control grid electrode 28 and the cathode electrode 26.

Turning first to Fig. 7, the connections are very much as in Fig. 6, except that the grid 28 and the plate 30 are no longer connected by the electro-mechanical vibrator. The vibrator is, instead, connected in parallel to the winding 66 of the modulation transformer, which winding may, indeed, be replaced by a resistor of high resistance with a new disposition of the microphone. Corresponding connections for transmitting by telegraph, or for receiving, will be obvious to those skilled in the art.

A receiving system is illustrated in Fig. 8. The vibrator is shown inserted in the plate circuit, between the plate and the filament, and is shown effectively connected in parallel with or shunted by that portion of the plate circuit that is illustrated as a bypass 74 for direct current. The bypass 74 may be a radio choke, an inductance coil or winding, a resistor, or a combination of these. The bypass 74 is preferably so chosen that the circuits shall have parameters such as to make the system stably non-oscillatory when the crystal is removed or restrained from vibration. A blocking condenser 76, shunted by a leak resistor 78, and a winding or inductance coil 80, shunted by a tuning condenser 82, to render the grid circuit tunable, are connected in the grid circuit, between the filament and the grid.

If the parameters of the circuits are properly chosen, as by approximate adjustment of the condenser 82, continuous oscillations will be set up in the system at a frequency determined by that mode of vibration of the vibrator corresponding to a natural or resonant frequency of the crystal in the direction of its electric axis, though it will not oscillate in the absence of the crystal. The system will oscillate even though the parameters be varied to within very wide limits, and the frequency will be maintained constant irrespective of variations in plate or filament voltage, load or other factors. This is not true of self-oscillating circuits in which the crystal acts merely as stabilizer. In the latter case, variation in the parameters of the circuit will result in the crystal ceasing to vibrate, though the circuits continue to oscillate. The system can be used as an oscillatory circuit.

As the system of Fig. 8 is illustrated as employed in a receiving circuit, the winding 80, which here replaces the impedance element 46, is shown coupled to a winding 84, in series with a receiving antenna 86 and a condenser 87, and grounded or connected to a counterpoise. The antenna 86 will receive the radio signals transmitted from the antenna 56, which will be detected by the telephone receiver 42.

The locally generated oscillations of the circuits of the tube 24 will beat with the oscillations received by the antenna 86, according to well-known principles, rendering the received signals audible in the telephone 42, or giving them any required superaudible frequency for superheterodyne reception. These locally generated oscillations may also be employed to supply a suppressed carrier frequency if desired.

A system of this character is adapted to receive high-frequency radiations, to which the electrical tuning elements are adjusted, and to superimpose upon them the frequency of mechanical vibration of the vibrator. The two frequencies are thus coexistent at the same time, permitting beats to be produced.

A tunable transmitting system, such, for example, as is illustrated in Fig. 9, and a tunable receiving system, such as is illustrated in Fig. 8, each supplied with a suitable vibrator, may, the one transmit, and the other receive, constant oscillations of very high frequency. This has been done by me over considerable distances. The constancy of the beat note and the consequent certainty of being always in adjustment to receive the given signals was found to be of great value, rendering possible the use of very high frequencies. If the vibrators at the sending and the receiving stations are of sufficiently different frequency, a fixed, superaudible beat will be produced, adapted for apparatus of the superheterodyne type.

The invention is readily adapted to power-amplifying systems; and one such system, adapted for transmission, is illustrated in Fig. 9. The connections are very much as in the transmitting system of Fig. 6, except that the winding 40, instead of being directly coupled to the winding 52 of the antenna circuit, is shown coupled or interlinked with a winding 88 that is shunted by a tuning condenser 90. The winding 88 is connected in the grid circuit of a second vacuum tube 92, biased by a battery 94. The winding 96 is connected in the plate circuit of the vacuum tube 92, and is coupled to the radiating antenna 56 through the antenna coil 52. The vibrator 2 determines the frequency of oscillation of the master oscillating circuit comprising the vacuum tube 24. The master oscillator, which may be of, say, 5 watts, controls, through power amplification, the tube 92 of much higher power, say 50 watts, and so forth. Such a system has been successfully operated by me in practice over a considerable distance. Any desired number of such amplifying units may be interposed in cascade without in any way departing from the present invention.

Fig. 10 illustrates a method of changing the mode of vibration of the electromechanical vibrator. As an example, I have found that, with an electromechanical vibrator having one electrode 12 connected to the grid and the other electrode 8 connected to the plate, as before described, the vibrator having in series with it an inductance coil of, say, 10 millihenries to 125 millihenries inductance, as described in my hereinafter-mentioned paper, the vibrator oscillates with a stable, highly constant frequency determined by the period of the vibrator along its electrical axis, the crystal vibrating in the direction of its thickness. This normally occurs when the switch arm 99 of Fig. 10 is in contact with the switch point 100 and corresponds, say, to the connections of Fig. 3. If, now, the switch arm 99 is shifted to the switch point 101, the same vibrator, being now connected, through the capacity 44, with the filament 26, corresponding, say, to the connections of Figs. 7 and 11, oscillates normally with a new stable frequency determined by a dimension at right angles to the said electrical axis. Since this dimension at right angles to the electrical axis is, in general, different from the dimension along the said axis, the shift of the switch arm 99 changes the oscillations from one stable frequency to another stable frequency. It is thus possible, in general, to obtain different frequencies, depending upon whether the crystal is connected between the filament and the grid or between the grid and a point in the plate circuit.

The prime reason for the different frequency vibrations will be made apparent when it is remembered that the frequency of the oscillations of an oscillating circuit depends upon the electrical parameters of the circuit. The crystal has capacitance, inductance and resistance of variable character, and these vary so as to have different effective values in accordance with the connections of the crystal between the electrodes of the vacuum tube. When the crystal is disposed between the grid and the filament, as in Figs. 7 and 11, it cooperates with the impedance of the rest of the system in such fashion that the resultant electrical parameters are of such values as to produce oscillations determined by one mode of vibration of the crystal. When the crystal is connected between the grid and the plate, as in Fig. 3, on the other hand, the resultant electrical parameters will be of such value that the oscillations will be determined by another mode of crystal vibration.

It is possible to obtain different frequencies first: by using the same coil 40 or other apparatus, and a different crystal; secondly, by using different coils 40 or other apparatus, and the same crystal; thirdly, by varying both the crystal and the other electrical apparatus; and finally, by connecting the crystal into the system in different ways, as before described.

It may be remembered that, in Fig. 3, for example, when the resultant effective impedances of the grid and the plate circuits are inductive, the resultant impedance of the crystal vibrator is capacitative; and where the resultant impedances of the grid and the plate circuits are capacitative, the resultant impedance of the crystal is inductive. When the crystal is connected between the grid 28 and the cathode 26, for predetermining the potential variation of the grid 28, as another illustration, the resonant means in the plate or output or anode circuit of the tube has an inductive reactance for the natural frequency of the crystal, or is tuned to a higher frequency than the said predetermined frequency, which is one of the natural frequencies of the crystal. The reactance of the choke coil 66 and of the crystal electrodes and of the capacity between the anode 30 and the cathode 26 is, therefore, such as to resonate at a frequency substantially less than the frequency at which the crystal is caused to operate. The voltages generated by the vibrations of the crystal between the grid 28 and the cathode 26 of the tube can produce oscillations only when the output circuit is adjusted so as to have the said inductive reactance. In all cases, the output circuit is tuned to a frequency approximately that of the said natural frequency. When the crystal is connected between the grid 28 and the cathode 26, the voltage across the output circuit is impressed upon the crystal through the capacity path between the grid 28 and the anode 30. When the crystal is connected between the grid 28 and the anode 30, the voltage across the output circuit may be impressed upon the crystal through the capacity path between the grid and the filament.

The piezo-electric-crystal-controlled oscillating circuit illustrated in Fig. 11 is based upon the circuit of Fig. 4 or Fig. 5, but with the crystal 2 shown between the filament 26 and the grid 28, instead of between the grid 28 and the plate 30 of the vacuum tube 24. This different disposal of the crystal may be obtained merely by moving the switch arm 99 of Fig. 10 into contact with the switch point 101, instead of the switch point 100. The reference numerals of Fig. 11 represent the same elements as heretofore described. The pair 8 and 12 of metal contact plates on each side of the crystal 2 are connected, respectively, to the filament 26 and the grid 28. The negative terminal of the source of potential 64 is connected to one end of the impedance element 46, and its positive terminal is connected direct to the filament 26, through a variable, filament-regulating rheostat. The impedance element 46 is so arranged that its opposite terminal is connected to the grid 28. The impedance element 46 may, for example, be a choke coil. The input circuit of Fig. 11, therefore, corresponds to the input circuit of the modulated, radio sending or transmitting system illustrated in Fig. 7, which, as before stated, may be used for receiving, by obvious changes, as illustrated in Fig. 4. The output, or plate oscillating, system corresponds to the output circuit of the said Fig. 4, and comprises the plate 30, the choke coil 42, the radio-frequency by-pass condenser 44, which bridges the choke coil 42 to afford a path for high-frequency currents that are choked by the choke coil 42, the high-potential source 32, and a resonant circuit consisting of the inductance 40, together with its distributive resistance, and the capacity 48.

I have also found that very minute variations of frequency of the order of one three-hundredth of one per cent may be introduced by bringing the electrodes more or less near to the piezo-electric vibrator. This is of importance in the final adjustment of such a vibrator, where extreme precision of frequency is required.

The invention may be applied also to many other uses. The oscillations, together with their harmonics, may, for example, serve as fixed values for the calibration of wavemeters and frequency meters, as is explained in a paper by me, entitled "Piezoelectric crystal resonator and crystal oscillators applied to the precision calibration of wavemeters" published in the "Proceedings of the American Academy of Arts and Sciences", vol. 59, No. 4, October, 1923.

These oscillators may also be employed with or without amplification to serve as sources in carrier wave systems.

The vibrations of the electro-mechanical vibrator may, in accordance with the present invention, be communicated to air or to some other elastic medium, as water, to produce sound for intercommunication or any other desired purposes.

Other uses and applications and other modifications within the scope of the present invention will readily occur to persons skilled in the art. It is therefore desired that the above-described embodiments of the invention shall be regarded as illustrative of the invention, and not restrictive, and that the appended claims be construed broadly, except insofar as it may be necessary to impose limitations in view of the prior art.

I claim:

1. An electro-mechanical system having, in combination, a vacuum tube, a grid circuit and a plate circuit through said tube, an electro-mechanical vibrator having two electrodes serving conjointly both for stimulation and response, one of said electrodes being connected to a point on the plate circuit and the other of said electrodes being connected to a point on the grid circuit, and so disposed as to maintain oscillations with the frequency of a mode of vibration of the electro-mechanical vibrator, said frequency being substantially independent of electrical tuning of any of said electric circuits.

2. An electro-mechanical system having, in combination, a vacuum tube, a grid circuit and a plate circuit through said tube, an electro-mechanical vibrator having two electrodes serving conjointly both for stimulation and response, one of said electrodes being connected to a point on the plate circuit and the other of said electrodes being connected to the grid, and so disposed as to maintain oscillations with the frequency of a mode of vibration of the electro-mechanical vibrator, said frequency being substantially independent of elecrical tuning of any of said electric circuits.

3. An electro-mechanical system having, in combination, vacuum-tube apparatus comprising a cathode electrode, a grid electrode and an anode electrode, an electro-mechanical vibrator having two electrodes only, means connecting one of the vibrator electrodes to the anode electrode, means connecting the other vibrator electrode to the grid electrode, and connections whereby the system is adapted to oscillate with the frequency of a mode of vibration of the electro-mechanical vibrator and widely independent of the electrical constants of the system.

4. An electro-mechanical system having, in combination, a vacuum tube having a cathode electrode, a grid electrode and an anode electrode, an electro-mechanical vibrator having electrodes disposed substantially perpendicular to an electric axis of the vibrator, means connecting one of the vibrator electrodes to the grid electrode, means connecting the other vibrator electrode to the anode electrode plate, and connections whereby the system is adapted to oscillate with the frequency of a mode of vibration of the electro-mechanical vibrator in substantially the direction of the said electric axis and widely independent of the electrical constants of the system.

5. An electro-mechanical system having, in combination, a vacuum tube comprising a cathode electrode, a grid electrode and an anode electrode, a condenser and an inductance connected with the cathode electrode and the anode electrode in parallel relation, and an electro-mechanical vibrator connected with the anode electrode and the grid electrode.

6. In a piezo-electric-crystal oscillating circuit, a crystal, a pair of metal contact plates on each side thereof, said plates being connected respectively to the grid and filament terminals of a vacuum tube, an impedance element, one end of which is connected to one terminal of a source of potential and so arranged that the opposite terminal of the impedance element is connected to the grid of the vacuum tube while the other terminal of said source of potential is connected direct to the filament of said tube, and a plate oscillating system which comprises the plate of the vacuum tube, a choke coil, a radio frequency by-pass condenser, a high potential source and a resonant circuit consisting of an inductance, a capacity and a resistance.

7. In a piezo-electric-crystal oscillating circuit, a vacuum tube comprising a cathode electrode, a grid electrode and an anode electrode, input and output circuits connecting the electrodes, a crystal, a pair of metal contact plates on each side thereof, said plates being connected respectively to the grid electrode and the cathode electrode, and an impedance element one end of which is connected to one terminal of a source of potential and so arranged that the opposite terminal of the impedance element is connected to the grid electrode while the other terminal of said source of potential is connected to the cathode electrode, the output circuit having an oscillating system comprising the anode electrode, an inductance, a high-potential source, and a resonant circuit.

8. In a piezo-electric-crystal oscillating circuit, a vacuum tube having grid, cathode and anode electrodes, a crystal, a pair of metal contact plates on each side thereof, said plates being connected respectively to the grid electrode and one of the other two said electrodes of the vacuum tube, and an impedance element one end of which is connected to one terminal of a source of potential and so arranged that the opposite terminal of the impedance element is connected to the grid electrode while the other terminal of said source of potential is connected to the cathode electrode, the output circuit having an oscillating system comprising the anode electrode, an inductance, high-potential source, and a resonant circuit.

9. An electromechanical system having, in combination, a tube comprising a cathode electrode, a grid electrode and an anode electrode, an output circuit connected with two of the electrodes, an electromechanical vibrator connected with the cathode electrode and the grid electrode, a transformer having a winding connected in parallel with the vibrator and a second winding, whereby the system is adapted to oscillate with the frequency of a mode of vibration of the vibrator, and a microphone in circuit with the second winding.

10. An electromechanical system having, in combination, a tube comprising a cathode electrode, a grid electrode and an anode electrode, an output circuit connected with two of the electrodes, a grid-biasing source of energy for the grid electrode, an electromechanical vibrator connected with two of the electrodes, a winding in circuit with the grid electrode in parallel relation to the vibrator, and a modulating means in inductive relation to said winding.

11. An electric system having, in combination, a tube having an input circuit and an output circuit, the circuits being substantially uncoupled together except through the tube, and an electromechanical vibrator connected in the input circuit to cause the system to oscillate at a frequency of a mode of vibration of the vibrator.

12. An electric system having, in combination, a hermetically sealed container within which are contained a cathode electrode and a plurality of additional electrodes, an input circuit including the cathode electrode and one of the additional electrodes, an output circuit coupled to the input circuit and including the cathode electrode and another of the additional electrodes, and an electromechanical vibrator connected in the input circuit only, the parameters of the system having electrical characteristics such as to render the system oscillatory under the control of the vibrator at a substantially constant frequency determined by a mode of vibration of the vibrator and such as to render the system stably non-oscillatory when not under the control of the vibrator, and the input circuit being substantially untuned except through the vibrator.

13. An electric system having, in combination, vacuum-tube apparatus having an input circuit and an output circuit coupled to the input circuit, and a piezo-electric body and an inductance connected in parallel in the input circuit, the input circuit being substantially untuned except through the body.

14. An electric system having, in combination, vacuum-tube apparatus having an input circuit and an output circuit coupled to the input circuit, a piezo-electric body and an inductance connected in parallel in the input circuit, the input circuit being substantially untuned except through the body, and a battery in series with the inductance.

15. An electric system having, in combination, vacuum-tube apparatus having an input circuit and an output circuit coupled together and each having an inductance, the inductances not being coupled together, and a piezo-electric body connected in parallel to the input-circuit inductance.

16. An oscillatory system having, in combination, a vacuum tube, a source of energy, a piezo-electric crystal body having two electrodes only, and means connecting the tube, the source and the body together to constitute an oscillatory system, the parameters of the system having electrical characteristics such as to render the system oscillatory under the control of the body at a substantially constant frequency determined by a mode of vibration of the body, and such as to render the system stably non-oscillatory when not under the control of the body.

17. An oscillatory system having, in combination, vacuum-tube apparatus comprising a cathode electrode, a grid electrode and an anode electrode, a source of energy, a piezo-electric crystal body having two electrodes only connected with the tube electrodes, means for biasing the grid electrode, and means connecting the vacuum-tube apparatus, the source and the body together to constitute an oscillatory system, the parameters of the system having electrical characteristics such as to render the system oscillatory under the control of the body at a substantially constant frequency determined by a mode of vibration of the body, and such as to render the system stably non-oscillatory when not under the control of the body.

18. An oscillatory system having, in combination, a single vacuum tube having a cathode electrode, a grid electrode and an anode electrode, a source of energy, a single piezo-electric crystal body, an impedance, a grid-biasing source of energy for the grid electrode, and means connecting the source between the cathode electrode and the anode electrode, and the body, the impedance and the grid-biasing source between the cathode electrode and the grid electrode to constitute an oscillatory system, the parameters of the system having electrical characteristics such as to render the system oscillatory under the control of the body at a substantially constant frequency determined by a mode of vibration of the body, and such as to render the system stably non-oscillatory when not under the control of the body.

19. An oscillatory system having, in combination, a vacuum tube, a source of energy, an electromechanical vibrator, and means connecting the tube, the source and the vibrator together to constitute an oscillatory system, the parameters of the system having electrical characteristics such as to render the system oscillatory under the control of the vibrator at a substantially constant frequency determined by a mode of vibration of the vibrator in substantially the direction of a shorter dimension of the vibrator, and such as to render the system stably non-oscillatory when not under the control of the vibrator.

20. An oscillatory system having, in combination, vacuum-tube apparatus having a plurality of electrodes, a source of energy, a piezo-electric body having a pair of electric terminals, said terminals being disposed transversely to an electric axis of the body and being connected with the electrodes, and means connecting the vacuum-tube apparatus, the source and the body together to constitute an oscillatory system, the parameters of the system having electrical characteristics such as to render the system oscillatory under the control of the body at a substantially constant frequency determined by a mode of vibration of the body corresponding to the direction of the said electric axis, and such as to render the system stably non-oscillatory when not under the control of the body, stimulation existing between said terminals and response existing between the same said terminals during the oscillation of the system, whereby the system will be maintained in oscillation and the body in vibration at the said frequency and widely independent of the electrical parameters of the system.

21. An oscillatory system having, in combination, a hermetically sealed container having a cathode electrode, a control electrode and an anode electrode, a circuit coupled to the control electrode and the cathode electrode, another circuit coupled to the cathode electrode and the anode electrode, means for subjecting the anode electrode and the control electrode in the respective said circuits to suitable operating potentials, an electromechanical vibrator having two electrodes only, and means coupling the vibrator to two of the electrodes to constitute an oscillatory system, the parameters of the system having electrical characteristics such as to render the system oscillatory under the control of the crystal at a substantially constant frequency determined by a mode of vibration of the crystal, and such as to render the system stably non-oscillatory when not under the control of the crystal.

22. An oscillatory system having, in combination, vacuum-tube apparatus having a cathode electrode, a grid electrode and an anode electrode, a circuit including said anode electrode and said cathode electrode, another circuit including said grid electrode and said cathode electrode, a piezo-electric crystal having a pair of electrodes disposed transversely to an electric axis of the crystal, and means connecting the crystal electrodes in one of the said circuits to constitute an oscillatory system, the parameters of the system having electrical characteristics such as to render the system oscillatory under the control of the crystal at a substantially constant frequency determined by a mode of vibration of the crystal corresponding to the direction of the said electric axis, and such as to render the system stably non-oscillatory when not under the control of the crystal.

23. An oscillatory system having, in combination, a vacuum tube comprising a cathode electrode, a grid electrode and an anode electrode, an input circuit connected with the cathode electrode and the grid electrode, an output circuit connected with the cathode electrode and the anode electrode, an electromechanical vibrator having a pair of terminals connected with two of the electrodes, and a source of energy connected in the output circuit, the parameters of the system having electrical characteristics such as to render the system oscillatory under the control of the vibrator at a substantially constant frequency determined by a mode of vibration of the vibrator and widely independent of the electrical parameters of the system, and such as to render the system stably non-oscillatory when not under the control of the vibrator, stimulation existing between said terminals and response existing between the same said terminals during the oscillation of the system.

24. An oscillatory system having, in combination, a vacuum tube comprising a cathode electrode, a grid electrode and an anode electrode, a source of energy, an electromechanical vibrator having a pair of terminals connected with the electrodes, and means connecting the source between the cathode electrode and the anode electrode and the vibrator between the cathode electrode and the grid electrode to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, stimulation existing between said terminals and response existing between the same said terminals during the oscillation of the system.

25. An oscillatory system having, in combination, a vacuum tube comprising a cathode electrode, a grid electrode and an anode electrode, a source of energy, an electromechanical vibrator having a pair of terminals connected with the electrodes, an impedance, and means connecting the source between the cathode electrode and the anode electrode and the vibrator and the impedance in parallel relation between the cathode electrode and the grid electrode to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, stimulation existing between said terminals and response existing between the same said terminals during the oscillation of the system.

26. An oscillatory system having, in combination, a vacuum tube comprising a cathode electrode, a grid electrode and an anode electrode, a source of energy, an electromechanical vibrator having electric terminals connected with the electrodes, a resistor, and means connecting the source between the cathode electrode and the anode electrode and the vibrator and the resistor in parallel relation between the cathode electrode and the grid electrode to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, stimulation existing between said terminals and response existing between the same said terminals during the oscillation of the system.

27. An oscillatory system having, in combination, vacuum-tube apparatus having an input circuit and an output circuit, a source of energy, a piezo-electric body, the input and output circuits being mechanically uncoupled, and means connecting the input and output circuits, the source and the body together to constitute an oscillatory system, the parameters of the system having electrical characteristics such as to render the system oscillatory under the control of the body at a substantially constant frequency determined by a mode of vibration of the body, and such as to render the system stably non-oscillatory when not under the control of the body.

28. An oscilatory system having, in combination, an amplifying relay having a plurality of electrodes, a source of energy, an electromechanical vibrator having two electrodes only, means connecting the relay, the source and the vibrator together to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, a winding connected with two of the relay electrodes, and means connected with the winding for transmitting electric wave energy to the system.

29. An electric system having, in combination, vacuum-tube apparatus having an input circuit and an output circuit, an electromechanical vibrator having two electrodes only and connected in the input circuit only, a source of energy connected in the output circuit, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, and means for modulating the oscillations in the system.

30. An electric system having, in combination, vacuum-tube apparatus having an input circuit and an output circuit and each having a coil, an electromechanical vibrator, and means connecting the vacuum-tube apparatus, the circuits and the vibrator together to constitute an oscillatory system, the parameters of the system having electrical characteristics such as to render the system oscillatory under the control of the vibrator at a substantially constant frequency determined by a mode of vibration of the vibrator, and the coils having inter-relations of such character and amount as to render the system incapable of fortuitously becoming oscillatory in the absence of the vibrations of the vibrator.

31. An electromechanical system having, in combination, an hermetically sealed container having therein an electron-emitting cathode, an inner cold electrode and an outer cold electrode, input and output circuits interconnecting the electrodes, an electromechanical vibrator, a source of energy, and means connecting the vacuum-tube apparatus, the source and the vibrator together to constitute a regenerative oscillatory system, substantially all the regeneration being effected through capacitive coupling between said cold electrodes within said hermetically sealed container, the parameters of the system having electrical characteristics such as to render the system oscillatory under the control of the vibrator at a substantially constant frequency determined by a mode of vibration of the vibrator, and the circuit connections and couplings being of such character as to inhibit parasitic oscillations of the system.

32. An oscillatory system having, in combination, a hermetically sealed container having therein a cathode electrode and a plurality of cold electrodes, circuits connecting said cold electrodes with said cathode electrode, a piezo-electric crystal having two electrodes only, and means connecting the crystal in the system, the parameters of the system having electrical characteristics such as to render the system oscillatory under the control of the crystal at a substantially constant frequency determined by a mode of vibration of the crystal, and such as to render the system stably non-oscillatory when not under the control of the crystal.

33. An electromechanical system having, in combination, vacuum-tube apparatus, input and output circuits connected with the apparatus, and a piezo-electric body connected with the system, the circuits being substantially uncoupled together except through the vacuum-tube apparatus, whereby the system will oscillate at a frequency of a mode of vibration of the body.

34. An electromechanical system having, in combination, an amplifying relay having an input circuit and an output circuit, a piezo-electric body, the circuits being substantially uncoupled together except through the relay, a source of energy, and means connecting the relay, the source and the body together to constitute an oscillatory system, whereby the frequency 35. An electric system having, in combination, an amplifying relay having an input circuit and an output circuit, the circuits being coupled through the relay, and a piezo-electric body and an inductance connected in parallel in the input circuit, the input circuit being substantially untuned except through the body.

36. An electric system having, in combination, an amplifying relay having an input circuit and an output circuit, the circuits being coupled through the relay, a source of energy in the output circuit, a piezo-electric body and an inductance connected in parallel in the input circuit, the input circuit being substantially untuned except through the body, and a battery in series with the inductance.

37. An electric system having, in combination, an amplifying relay having an input circuit and an output circuit, the circuits being coupled through the relay, a source of energy in the output circuit, and a piezo-electric body and an inductance connected in parallel in the input circuit, the input circuit being substantially untuned except through the body.

38. An oscillatory system having, in combination, an electromechanical vibrator with two electric terminals, said terminals serving both for electric stimulation and electric response, a source of electric energy, an amplifying device and connections to maintain the system in vibration with a frequency widely independent of the electrical constants of the system, the electrical parameters of the system being such that the system is inhibited from fortuitously becoming oscillatory in the absence of the vibrator.

39. An oscillatory system having, in combination, an electromechanical vibrator with two electric terminals, said terminals serving both for electric stimulation and electric response, a source of electric energy, a repeating device and connections to maintain the system in vibration with a frequency widely independent of the electrical constants of the system, the electrical parameters of the system being such that the system is inhibited from fortuitously becoming oscillatory in the absence of the vibrator.

40. An oscillatory system having, in combination, an electromechanical vibrator comprising a piezo-electric body with two electric terminals, said terminals serving both for electric stimulation and electric response, a source of electric energy, an amplifying device and connections to maintain the system in vibration with a frequency widely independent of the electrical constants of the system, the electrical parameters of the system being such that the system is inhibited from fortuitously becoming oscillatory in the absence of the vibrator.

41. An oscillatory system having, in combination, an electromechanical vibrator with two electric terminals, said terminals serving both for electric stimulation and electric response, a source of electric energy, a vacuum-tube amplifying device and connections to maintain the system in vibration with a frequency widely independent of the electrical constants of the system, the electrical parameters of the system being such that the system is inhibited from fortuitously becoming oscillatory in the absence of the vibrator.

42. An electromechanical system having, in combination, a vacuum tube having a cathode electrode, a grid electrode and an anode electrode, an electromechanical vibrator having two electrodes, one of the vibrator electrodes being connected with one of the vacuum-tube electrodes and the other vibrator electrode being connected with another of the vacuum-tube electrodes, whereby the two vibrator electrodes are adapted to act conjointly both for stimulation and response, and connections whereby the system is adapted to oscillate with the frequency of a mode of vibration of the electromechanical vibrator, the electrical parameters of the system being such that the system is inhibited from fortuitously becoming oscillatory in the absence of the vibrator.

43. An electromechanical system having, in combination, vacuum-tube apparatus comprising a plurality of electrodes, an electro-mechanical vibrator having two electrodes, means connecting one of the vibrator electrodes to one of the plurality of electrodes, means connecting the other vibrator electrode to another of the plurality of electrodes, whereby the two vibrator electrodes are adapted to act conjointly both for stimulation and response, and connections whereby the system is adapted to oscillate with the frequency of a mode of vibration of the electromechanical vibrator and widely independent of the electrical constants of the system, the electrical parameters of the system being such that the system is inhibited from fortuitously becoming oscillatory in the absence of the vibrator.

44. An electromechanical system having, in combination, a vacuum tube having three electrodes, an electromechanical vibrator having electrodes disposed substantially perpendicular to an electric axis of the vibrator, means connecting one of the vibrator electrodes to one of the tube electrodes, means connecting the other vibrator electrode to another of the tube electrodes, and connections whereby the system is adapted to oscillate with the frequency of a mode of vibration of the electromechanical vibrator in substantially the direction of the said electric axis and widely independent of the electrical constants of the system.

45. An electromechanical system having, in combination, vacuum-tube apparatus comprising a plurality of electrodes, an electromechanical vibrator having electrodes disposed substantially perpendicular to an electric axis of the vibrator, means connecting one of the vibrator electrodes to one of the plurality of electrodes, means connecting the other vibrator electrode to another of the plurality of electrodes, and connections whereby the system is adapted to oscillate with the frequency of a mode of vibration of the electromechanical vibrator in substantially the direction of the said electric axis and widely independent of the electrical constants of the system.

46. An electromechatical system having, in combination, vacuum-tube apparatus comprising a plurality of electrodes, an electromechanical vibrator connected with two of the electrodes, whereby the system is adapted to oscillate with the frequency of a mode of vibration of the electromechanical vibrator, a transformer having a winding connected with two of the electrodes and a second winding, and a microphone in circuit with the second winding.

47. An electromechanical system having, in combination, vacuum-tube apparatus comprising a plurality of electrodes, a biasing source of energy for one of the electrodes, an electromechanical vibrator connected with two of the electrodes, a winding in circuit with the said one electrode and another electrode, and a microphone and a winding coupled to the first-named winding in circuit with the microphone.

48. An oscillatory system having, in combination, an electric circuit, a piezo-electric crystal having two electrodes only and in which response coexists with stimulation during the oscillations of the system, the electrodes being connected with the circuit to cause the system to oscillate at the frequency determined by a mode of vibration of the crystal, the parameters of the system having electrical characteristics such that the system is inhibited from fortuitously becoming oscillatory in the absence of the vibrations of the vibrator.

49. An electromechanical system having, in combination, a vacuum tube having a grid electrode, an anode electrode and a cathode electrode, means for biasing said grid electrode, a grid circuit and an anode circuit coupled through said tube, and a piezo-electric crystal having two electrodes serving conjointly both for stimulation and response, said electrodes being connected respectively to the grid electrode and the cathode electrode, the parameters of the system having electrical characteristics such as to render the system oscillatory under the control of the crystal at a substantially constant frequency determined by a mode of vibration of the crystal and substantially independent of electrical tuning of any of said electric circuits, and the said parameters having values stably far removed from values that would render the system oscillatory in the absence of the crystal.

50. An oscillatory system having, in combination, vacuum-tube apparatus having a cathode electrode, a grid electrode and an anode electrode, a circuit including said anode electrode and said cathode electrode, another circuit including said grid electrode and said cathode electrode, a piezo-electric crystal, and means connecting the crystal in one only of the said circuits to constitute an oscillatory system, the parameters of the system having electrical characteristics such as to render the system oscillatory under the control of the crystal at a substantially constant frequency determined by a mode of vibration of the crystal, and such as to render the system stably non-oscillatory when not under the control of the crystal.

51. In an oscillation generator, a vacuum tube, a quartz crystal in circuit with said tube, and a tunable resonant circuit connected in the output circuit of the tube.

52. In an oscillation generator, a three electrode vacuum tube, a piezo-electric element in circuit with the grid electrode and one other electrode of said tube, and a parallel connected inductance and capacity constituting a tunable resonant circuit in the output circuit of said tube.

53. In an oscillation generator, a three electrode vacuum tube, a piezo-electric element in circuit with two electrodes of the tube, means associated with the tube for obtaining oscillations in said element, and a leakage path from the grid electrode to the filament electrode of said tube, said leakage path including a choke coil.

54. In an oscillation generator, a three electrode vacuum tube, a piezo-electric element having a natural period of oscillation in circuit with the grid and filament electrodes of said tube, and resonant means, in the plate circuit of the tube, said resonant means being tuned to a frequency of higher period than that of the element for obtaining oscillations at the natural period of the element.

55. In an oscillation generator, a vacuum tube, having an input circuit including a quartz crystal provided with two electrodes, a connection between one of said crystal electrodes and the grid electrode of said vacuum tube, another connection between the other of said crystal electrodes and another electrode of said vacuum tube and a tunable circuit external to said input circuit associated with the output circuit of said vacuum tube for obtaining electrical oscillations of a frequency determined by a natural frequency of vibration of said quartz crystal.

56. In an oscillation generator, a vacuum tube, having an input circuit including a quartz crystal provided with two electrodes, a connection between one of said crystal electrodes and the grid of said vacuum tube, another connection between the other of said crystal electrodes and the cathode of said vacuum tube and a tunable circuit external to said input circuit associated with the output circuit of said vacuum tube for obtaining electrical oscillations of a frequency determined by a natural frequency of vibration of said crystal.

57. In an oscillation generator, a single vacuum tube having an input circuit and an output circuit, a single piezo-electric element in circuit with the grid electrode and one other electrode only of said tube, an inductance connected in circuit with the plate electrode of said tube, and an impedance external to the input circuit adjustably connected to the inductance, the parameters of the system having electrical characteristics such as to render the system oscillatory under the control of the crystal at a substantially constant frequency determined by a mode of vibration of the crystal, and such as to render the system stably non-oscillatory when not under the control of the crystal.

58. In an oscillation generator, a vacuum tube having an input circuit and an output circuit, a quartz crystal provided with two electrodes only, connections between said electrodes and the grid and cathode of said vacuum tube, an inductance connected in the output circuit of said tube, and an inductance external to the input circuit adjustably coupled to the first-named inductance, a capacity being connected with one of the inductances, the parameters of the system having electrical characteristics such as to render the system oscillatory under the control of the crystal at a substantially constant frequency determined by a mode of vibration of the crystal, and such as to render the system stably non-oscillatory when not under the control of the crystal.

59. In an oscillation generator, a vacuum tube, a piezo-electric element in circuit with the grid and cathode of said vacuum tube, a leakage path including a choke coil connected between said grid and cathode and a tunable circuit associated with the output circuit of said vacuum tube.

60. In an oscillation generator, a vacuum tube, a piezo-electric element connected between the grid and another electrode of said vacuum tube, a leakage path including a choke coil connected between said grid electrode and cathode and a tunable circuit associated with the output of said vacuum tube.

61. In an oscillation generator, a vacuum tube, having a control circuit comprising a quartz crystal connected between a control electrode and another electrode of said vacuum tube and a resonant tunable circuit external to the control circuit of said tube and associated with a circuit between the cathode and an electrode of said vacuum tube which electrode is maintained at an average potential different from that of said cathode.

62. In an oscillation generator, a vacuum tube, having an input circuit comprising a quartz crystal connected between a control electrode and cathode of said vacuum tube and a tunable resonant circuit external to said input circuit of said tube and associated with a circuit between the cathode and an electrode of said tube which electrode is maintained at an average potential different from that of said cathode.

63. In a system comprising a quartz crystal having a natural frequency of mechanical vibration and a vacuum tube, the method of generating electrical oscillations of constant frequency which consists in impressing voltages generated by vibrations of said quartz crystal between the grid and cathode of the vacuum tube, and adjusting the output circuit of said vacuum tube so that it has an inductive reactance for said natural frequency.

64. In a system comprising a quartz crystal having a natural frequency of mechanical vibration and a vacuum tube, the method of generating electrical oscillations of constant frequency which consists in impressing voltages generated by vibrations of said quartz crystal between the grid and another electrode of said vacuum tube, tuning the output circuit of said vacuum tube to a frequency approximately that of said natural frequency, and impressing the voltage across said output circuit through a capacity path upon said quartz crystal to sustain the vibrations thereof.

65. An oscillation generator comprising a three electrode vacuum tube, a piezo-electric element connected between the cathode and the grid of said tube for predetermining the frequency of the potential variations of the grid, and a circuit connected between the plate and the filament of said vacuum tube which is tuned to a frequency higher than the said predetermined frequency.

66. An oscillation generator comprising a vacuum tube, having at least a cathode, a plate and a grid, a piezo-electric element capable of vibrating at a plurality of frequencies connected between the cathode and the grid of said tube for predetermining the frequency of the potential variations of the grid, and a circuit interconnecting the plate and the cathode and tuned to a frequency higher than one of said plurality of frequencies.

67. A generating system of constant frequency oscillations comprising a vacuum tube, a piezo-electric element of hard, durable material provided with a single pair of operative electrodes in circuit with said tube, and a resonant circuit in the output of said tube carrying oscillating currents having a frequency determined at all times by a natural period of mechanical vibration of said piezo-electric element, said piezo-electric element constituting an essential element in the system for the generation of oscillations.

68. A generating system of constant frequency oscillations comprising an amplifier, a piezo-electric element of hard, durable material in circuit with said amplifier, and a resonant circuit in the output of said amplifier carrying oscillating currents having a frequency determined at all times by a natural period of mechanical vibration of said piezo-electric element, said piezo-electric element constituting an essential element in the system for the generation of oscillations.

69. An electromechanical system having, in combination, a plurality of tubes connected in cascade and each having a cathode electrode, a grid electrode and an anode electrode, and an electromechanical vibrator connected with the grid electrode and the anode electrode of one of the tubes.

70. An electromechanical system having, in combination, a plurality of tubes connected in cascade and each having a cathode electrode, a grid electrode and an anode electrode, and an electromechanical vibrator having two electrodes, one of the vibrator electrodes being connected to the grid electrode of one tube, and the other vibrator electrode being connected with the anode electrode of the said one tube.

71. The combination of a vacuum tube of the three-electrode type having an input circuit and an output circuit, a piezo-electric device opposite sides of which are connected between the plate and grid electrodes of the tube, said piezo-electric device coupling said circuits so that energy may be fed from the output circuit to the input circuit controlled and stabilized as to frequency in accordance with the natural period of the piezo-electric device, and means for controlling the amplitude of the current so fed back.

72. An oscillatory system having, in combination, lower and upper crystal electrodes having oppositely disposed substantially horizontal substantially flat surfaces, a piezo-electric crystal supported between the electrodes having oppositely disposed substantially flat faces disposed respectively adjacent and substantially parallel to the flat surfaces of the electrodes, the crystal having an electric axis substantially perpendicular to the said substantially flat faces of the crystal, a tube having three tube electrodes, namely, a cathode electrode, a grid electrode and an anode electrode, a circuit including two of the tube electrodes, and means connecting one of the crystal electrodes with one of the said two tube electrodes and the other crystal electrode with the third tube electrode to constitute an oscillatory system, the parameters of the system having electrical characteristics such as to render the system oscillatory under the control of the crystal at a substantially constant frequency determined by a mode of vibration of the crystal, and such as to render the system stably non-oscillatory when not under the control of the crystal.

73. An oscillatory system having, in combination, lower and upper crystal electrodes having oppositely disposed substantially horizontal substantially flat surfaces, a piezo-electric crystal supported between the electrodes having oppositely disposed substantially flat faces disposed respectively adjacent and substantially parallel to the flat surfaces of the electrodes, the crystal having an electric axis substantially perpendicular to the said substantially flat faces of the crystal, a tube having a cathode electrode, a grid electrode and an anode electrode, a circuit including the grid electrode and the cathode electrode and comprising means for subjecting the grid electrode to a potential negative with respect to the potential of the cathode electrode, another circuit including the anode electrode and the cathode electrode and comprising a coil and means for applying a potential to the anode electrode positive with respect to the potential of the cathode electrode, and means connecting the crystal electrodes to the grid electrode and the cathode electrode to constitute an oscillatory system, the parameters of the system having electrical characteristics such as to render the system oscillatory under the control of the crystal at a substantially constant frequency determined by that mode of vibration of the crystal corresponding to the direction of the said electric axis, and such as to render the system stably non-oscillatory when not under the control of the crystal.

74. An oscillatory system having, in combination, an amplifying relay having a plurality of electrodes, a source of energy, an electromechanical vibrator having two electrodes only, means connecting the relay, the source and the vibrator together to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, a winding connected with two of the relay electrodes, and means connected with the winding for transmitting electric wave energy from the system.

75. In an electrical system, an hermetically sealed container wherein are contained an electron-emitting cathode and a pair of cold electrodes spaced from said cathode, circuits interconnecting said pair of electrodes and said cathode, and a coupling circuit coupling together said cold-electrode-cathode circuits, said coupling circuit comprising a two-electrode piezo-electric crystal.

76. An oscillator comprising an electron discharge device having within an hermetically sealed container an electron-emitting cathode and a pair of relatively cold electrodes, circuits connecting said cold electrodes to said cathode for subjecting said cold electrodes to different polarizing potentials, and an electromechanical vibrator connected between said cold electrodes.

77. Apparatus as claimed in the preceding claim characterized further by the fact that said cold electrodes are unequally spaced from said cathode, that the cold electrode nearest said cathode is subjected to a negative potential with respect to said cathode, that the cold electrode further from said cathode is subjected to a relatively positive potential with respect to said cathode, and that the electromechanical vibrator is in the form of a piezo-electric crystal.

78. An oscillation generating system comprising an hermetically sealed container wherein are contained an electron-emitting cathode and a plurality of cold electrodes unequally spaced from and subject to different polarizing potentials with respect to said cathode, a piezo-electric crystal having two electrodes, and connections operatively connecting said crystal electrodes to said cold electrodes, whereby oscillations are produced at a frequency determined by said piezo-electric crystal.

79. Apparatus as claimed in the preceding claim characterized by the additional fact that an inductance coil is connected between one of said cold electrodes and said cathode.

80. Apparatus as claimed in claim 78 characterized by the fact that an inductance coil is connected between said electrode maintained at said relatively positive potential and said cathode.

81. In a frequency-control system, an electron tube having grid, filament and plate electrodes, input and output circuits interconnecting said electrodes, a high-potential supply system connected in said output circuit, an impedance element in series therewith, a piezo-electric-crystal element connected in said input circuit to control the operation of said circuits, and an independent impedance element connected in said input circuit, the output circuit comprising a high-frequency oscillation circuit connected to sustain therein high-frequency oscillations corresponding to the natural frequency of said piezo-electric-crystal element.

82. An oscillatory system having, in combination, an hermetically sealed container having therein an electron-emitting cathode electrode, an inner cold electrode and an outer cold electrode, a source of energy, an impedance, a piezo-electric crystal having two electrodes only, and means connecting the impedance and the source between said outer cold electrode and said cathode electrode and the crystal between said inner cold electrode and said cathode electrode to constitute a regenerative oscillatory system, substantially all of the regeneration being effected through capacitive coupling between said cold electrodes within said hermetically sealed container, with said crystal forming the only path between said inner cold electrode and said cathode in which high-frequency currents corresponding to a natural frequency of said crystal cause resonance effects, the parameters of the system having electrical characteristics such as to render the system oscillatory under the control of the crystal at a substantially constant frequency determined by a mode of vibration of the crystal and such as to render the system stably non-oscillatory when not under the control of the crystal.

83. An oscillatory system having, in combination, an hermetically sealed container having therein an electron-emitting cathode electrode, an inner cold electrode and an outer cold electrode, a source of energy, an impedance, a piezo-electric crystal having two electrodes only, and means connecting the impedance and the source between said outer cold electrode and said cathode electrode and the crystal between said inner cold electrode and said cathode electrode to constitute an oscillatory system with said crystal forming the only path between said inner cold electrode and said cathode in which high-frequency currents corresponding to a natural frequency of said crystal cause resonance effects, the parameters of the system having electrical characteristics such as to render the system oscillatory under the control of the crystal at a substantially constant frequency determined by a mode of vibration of the crystal and such as to render the system stably non-oscillatory when not under the control of the crystal.

84. An electron-tube oscillator comprising an electron tube having grid, cathode and plate electrodes, an output circuit connected across said plate and cathode electrodes, means controlling the frequency of said oscillator comprising a piezo-electric crystal, said piezo-electric crystal being in circuit with said grid and cathode electrodes, means connected in shunt with said piezo-electric crystal for preventing the crystal oscillating voltage from passing substantially beyond the zero grid-voltage point and becoming a positive voltage, and a resonant circuit connected with said output circuit for sustaining oscillations delivered by said piezo-electric crystal at a frequency corresponding to the natural frequency of said piezo-electric crystal.

85. An oscillatory system having, in combination, vacuum-tube apparatus, input and output circuits connected with the vacuum-tube apparatus, a piezo-electric body, a source of energy, and means connecting the source in the output circuit and the body in the input circuit to constitute an oscillatory system the frequency of the oscillations of which shall be substantially constant and determined by a mode of vibration of the body, and means in the input circuit in parallel with the body for choking back currents of the frequency of the said oscillations.

86. An oscillatory system having, in combination, an hermetically sealed container having therein an electron-emitting cathode electrode, an inner cold electrode and an outer cold electrode, a source of energy, a coil, a piezo-electric crystal having only two electrodes connected respectively with said inner cold electrode and said cathode electrode, said crystal forming the only path between said inner cold electrode and said cathode electrode in which high-frequency currents corresponding to a natural frequency of said crystal cause resonance effects, a circuit connected between said cathode electrode and said inner cold electrode for subjecting said inner cold electrode to a negative potential with respect to said cathode electrode, a circuit connected between said outer cold electrode and said cathode electrode for subjecting said outer cold electrode to a positive potential with respect to said cathode, and means connecting the source of energy and the coil in the last-named circuit, the parameters of the system having electrical characteristics such as to render the system oscillatory under the control of the crystal at a substantially constant frequency determined by a mode of vibration of the crystal, and such as to render the system stably non-oscillatory in the absence of the crystal.

87. An oscillatory system having, in combination, an hermetically sealed container having therein an electron-emitting cathode electrode, an inner cold electrode and an outer cold electrode, a source of energy, a circuit having inductance and capacity, a piezo-electric crystal having only two electrodes, and means connecting said circuit and said source between said outer cold electrode and said cathode electrode and the crystal between said inner cold electrode and said cathode electrode to constitute an oscillatory system with said crystal forming the only path between said inner cold electrode and said cathode electrode which is subject to resonance effects by high-frequency currents of a frequency of the order of magnitude of the natural frequency of said crystal, and means for subjecting said inner cold electrode to a negative potential with respect to said cathode electrode, the parameters of the system having electrical characteristics such as to render the system oscillatory under the control of the crystal at a substantially constant frequency determined by a mode of vibration of the crystal, and such as to render the system stably non-oscillatory when not under the control of the crystal.

88. An electric system having, in combination, vacuum-tube apparatus having an input circuit and an output circuit, and an electromechanical vibrator connected in the input circuit only, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, and the input circuit being substantially untuned for the frequency of oscillation except through the vibrator.

89. An electric system having, in combination, vacuum-tube apparatus having an input circuit and an output circuit, and an electromechanical vibrator and a path for direct current connected in parallel in the input circuit, the parameters of the system having electrical characteristics such as to render the system oscillatory under the control of the vibrator at a substantially constant frequency determined by a mode of vibration of the vibrator and such as to render the system stably non-oscillatory when not under the control of the vibrator.

90. An electromechanical system having, in combination, vacuum-tube apparatus comprising a cathode electrode, a grid electrode and an anode electrode, a condenser and an inductance connected with two of the electrodes in parallel relation, an electromechanical vibrator having only two electrodes serving both for stimulation and response, and means connecting the vibrator electrodes with one of said two vacuum-tube-apparatus electrodes and with the third vacuum-tube-apparatus electrode to cause said system to oscillate with a frequency determined by said electromechanical vibrator.

91. An electromechanical system for producing oscillations having, in combination, a vacuum tube, a grid electrode, an anode electrode, and a cathode electrode actively cooperating therein, an admittance between the cathode electrode and the grid electrode, a second admittance between the cathode electrode and the anode electrode, one of said admittances being an electromechanical vibrator, and the other of said admittances being a tunable electric element, said system being adjusted to oscillate with a frequency determined by said electromechanical vibrator and essentially independent of variations of the parameters of the electrical elements of the system.

92. An oscillatory system having, in combination, a vacuum tube having a cathode electrode, a grid electrode and an anode electrode, a circuit including two of the electrodes, an electromechanical vibrator, and means connecting the vibrator with one of the said two electrodes and with the third electrode to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator.

93. An oscillatory system having, in combination, a hermetically sealed container having therein a cathode electrode and a plurality of cold electrodes, circuits connecting said cold electrodes with said cathode electrode, said circuits being substantially electrically and mechanically disassociated except at the common connection to the cathode electrode and except by virtue of the association of the cathode electrode and the cold electrodes within said container, a piezo-electric crystal having two electrodes only, and means connecting the crystal electrodes in one of said circuits to constitute an oscillatory system in which the crystal electrodes shall act conjointly both for stimulation and response, the parameters of the system having electrical characteristics such as to render the system oscillatory under the control of the crystal at a substantially constant frequency determined by a mode of vibration of the crystal, and such as to render the system stably non-oscillatory when not under the control of the crystal.

94. An electron discharge device oscillator comprising an electron discharge device having an anode a cathode and a control electrode, means for polarizing the electrodes of said electron discharge device, a piezo-electric crystal resonator coupled to electrodes of said electron discharge device, and, a choke coil effectively in shunt with said piezo-electric crystal, the inductance of the coil together with the capacity of the electrodes of said crystal and the interelectrode capacity of said electron discharge device being such as to resonate at a frequency substantially less than the frequency at which said crystal is caused to operate.

95. An electron discharge device oscillator comprising an electron discharge device having an anode a cathode and a control electrode, means for polarizing the electrodes of said device, a piezo-electric crystal for controlling the frequency of oscillations generated by said device, said piezo-electric crystal being connected between a plurality of electrodes of said device, a choke coil for supplying unidirectional potential to one of the electrodes to which said piezo-electric crystal is connected, the inductance of the choke coil together with the capacity of the electron discharge device and the electrodes of said crystal being such as to resonate at a frequency from 50 percent to 80 percent of the frequency of oscillations generated by said electron discharge device oscillator.

96. In apparatus of the character described, an electron discharge device having within an hermetically sealed container, an electron emitting cathode, an anode, and a grid structure intermediate said anode and cathode, a piezoelectric crystal connected to two of the electrodes of said electron discharge device for starting and maintaining oscillation generation by said device at a frequency corresponding to a natural frequency of said crystal, and, a circuit effectively in shunt with said crystal for establishing a unidirectional current path to an electrode of said device to which said crystal is connected, said circuit in combination with the capacities associated with said piezo-electric crystal being of such a value in impedance as to resonate at a frequency substantially lower than the frequency of oscillation of said crystal.

97. In apparatus of the character described, an electron discharge device having within an hermetically sealed container, an electron emitting cathode, an anode, and a grid structure intermediate said anode and cathode, a piezoelectric crystal connected to two of the electrodes of said electron discharge device for starting and maintaining oscillation generation by said device at a frequency corresponding to a natural frequency of said crystal, and, a circuit effectively in shunt with said crystal for establishing a unidirectional current path to an electrode of said device to which said crystal is connected, said circuit in combination with the capacities associated with said piezo-electric crystal being of such a value in impedance as to resonate at a frequency from 50 to 80 percent of the frequency of oscillation of said piezo-electric crystal.

98. Oscillatory apparatus comprising an electron discharge device having within an evacuated container an anode, an electrode emitting cathode and an electrode intermediate said anode and cathode, means for polarizing said intermediate electrode to a negative potential relative to said cathode. means to polarize said anode to a positive potential with respect to said cathode, an electromechanical resonator, and connections connecting said electromechanical resonator to two of said electrodes for starting and maintaining generation of oscillations at a frequency corresponding to a frequency of said electromechanical resonator, the inductance of said connections together with the electrical characteristics of said resonator and the interelectrode capacity of said device being such as to resonate at a frequency substantially less than the frequency at which said resonator vibrates.

99. An electron-discharge-device oscillator comprising an electron-discharge device having an anode electrode, a cathode electrode and a control electrode, means for polarizing the electrodes of said device, a piezo-electric crystal for controlling the frequency of oscillations generated by said device, said piezo-electric crystal being connected between a plurality of electrodes of said device, and a choke coil for supplying unidirectional potential to one of the electrodes to which said piezo-electric crystal is connected, the parameters of the oscillator having electrical characteristics such as to render the oscillator oscillatory under the control of the crystal at a substantially constant frequency determined by a mode of vibration of the crystal, and such as to render the oscillator stably non-oscillatory when not under the control of the crystal.

100. An electron-discharge-device oscillator comprising an electron-discharge device having an anode electrode, a cathode electrode and a control electrode, means for polarizing the electrodes of said electron-discharge device, and a piezo-electric crystal resonator having two electrodes only coupled to electrodes of said electron-discharge device, the parameters of the oscillator having electrical characteristics such as to render the oscillator oscillatory under the control of the resonator at a substantially constant frequency determined by a mode of vibration of the resonator, and such as to render the oscillator stably non-oscillatory when not under the control of the resonator.

101. An electron-discharge-device oscillator having, within an hermetically-sealed container, an electron-emitting cathode electrode, an anode electrode, and a grid-electrode structure intermediate said anode and cathode electrodes, and a piezo-electric crystal having two electrodes only connected to two of the electrodes of said electron-discharge device for starting and maintaining oscillation generation by said device at a frequency corresponding to a natural frequency of said crystal, the parameters of the oscillator having electrical characteristics such as to render the oscillator oscillatory under the control of the crystal at a substantially constant frequency determined by a mode of vibration of the crystal, and such as to render the oscillator stably non-oscillatory when not under the control of the crystal.

102. Apparatus of the character described having, in combination, an electron-discharge-device oscillator having a single hermetically-sealed container provided with an electron-emitting cathode electrode, an anode electrode and a grid-electrode structure intermediate said anode and cathode electrodes, a single piezo-electric crystal connected to two of the electrodes of said electron-discharge device for starting and maintaining oscillation generation by said device at a frequency corresponding to a natural frequency of said crystal, and a circuit effectively in shunt with said crystal for establishing a unidirectional current path to an electrode of said device to which said crystal is connected, the parameters of the oscillator having electrical characteristics such as to render the oscillator oscillatory under the control of the crystal at a substantially constant frequency determined by a mode of vibration of the crystal, and such as to render the oscillator stably non-oscillatory when not under the control of the crystal.

103. Oscillatory apparatus comprising an electron-discharge device having within an evacuated container an anode electrode, an electron-emitting cathode electrode and an electrode intermediate said anode and cathode electrodes, means for polarizing the electrodes of said electron-discharge device, an electromechanical resonator having two electrodes only, and connections connecting said electromechanical resonator to two of said electrodes for starting and maintaining generation of oscillations at a frequency corresponding to a frequency of said electromechanical resonator, the parameters of the oscillatory apparatus having electrical characteristics such as to render the oscillatory apparatus oscillatory under the control of the resonator at a substantially constant frequency determined by a mode of vibration of the resonator, and such as to render the oscillatory apparatus stably non-oscillatory when not under the control of the resonator.

104. An oscillatory system having, in combination, a single vacuum tube, having a cathode electrode, a grid electrode and an anode electrode, a source of energy, a single piezo-electric crystal body, an impedance connected in parallel relation to the body, and means connecting the source between the cathode electrode and the anode electrode, and the body and the impedance between the cathode electrode and the grid electrode to constitute an oscillatory system, the parameters of the system having electrical characteristics such as to render the system oscillatory under the control of the body at a substantially constant frequency determined by a mode of vibration of the body, and such as to render the system stably non-oscillatory when not under the control of the body.

105. A method of controlling the frequency of vibration of a piezo-electric crystal that comprises changing the temperature of the crystal from normal room temperature to a temperature to cause oscillation at a desired substantially precise frequency of vibration.

106. In a piezo-electric-crystal apparatus comprising lower and upper crystal electrodes having oppositely disposed substantially horizontal substantially flat surfaces, and a piezo-electric crystal having substantially flat upper and lower substantially horizontal faces, the crystal resting on the lower electrode with its upper substantially flat face adjacent to the substantially flat lower face of the upper electrode, the crystal having an electric axis substantially perpendicular to the said substantially flat faces of the crystal, a method of controlling the frequency of operation that comprises changing the temperature of the crystal from normal room temperature to a temperature to cause oscillation at a desired substantially precise frequency of operation.

GEORGE W. PIERCE.